(12) United States Patent
Lin et al.

(10) Patent No.: US 8,477,485 B2
(45) Date of Patent: Jul. 2, 2013

(54) SLIDE MECHANISM AND ELECTRONIC DEVICE USING THE SAME

(75) Inventors: Hsiao-Chun Lin, Taoyuan County (TW); Chun-Yu Chen, Taoyuan County (TW)

(73) Assignee: FIH (Hong Kong) Limited, Kowloon (HK)

( * ) Notice: Subject to any disclaimer, the term of this patent is extended or adjusted under 35 U.S.C. 154(b) by 347 days.

(21) Appl. No.: 12/942,167

(22) Filed: Nov. 9, 2010

(65) Prior Publication Data
US 2012/0026651 A1 Feb. 2, 2012

(30) Foreign Application Priority Data
Jul. 29, 2010 (TW) .............................. 99125068 A

(51) Int. Cl.
*G06F 1/16* (2006.01)
(52) U.S. Cl.
USPC ................... 361/679.08; 455/575.4; 312/321; 439/571
(58) Field of Classification Search
USPC ............... 361/679.01, 679.27, 679.4, 679.08, 361/679.43, 679.44, 679.56, 679.59, 679.46, 695; 455/575.4, 575.3, 575.1, 422.1, 566; 312/223.2, 223.3, 334.4, 323, 219, 220, 221, 312/321, 319.2, 111, 108, 138.1, 334.5; 345/8, 345/163; 384/41; 74/100.1; 16/324, 65, 49, 16/72, 27.3; 439/571, 65, 862, 157
See application file for complete search history.

(56) References Cited

U.S. PATENT DOCUMENTS

| | | | | |
|---|---|---|---|---|
| 2010/0085721 | A1* | 4/2010 | Dong et al. | 361/807 |
| 2011/0017001 | A1* | 1/2011 | Lin | 74/100.1 |
| 2011/0096475 | A1* | 4/2011 | Duan et al. | 361/679.01 |

* cited by examiner

*Primary Examiner* — Hung Duong
(74) *Attorney, Agent, or Firm* — Altis Law Group, Inc.

(57) ABSTRACT

An electronic device includes an upper body, a lower cover, a lower body, and a slide mechanism installed between the upper body and the lower cover. The lower cover is fastened on the lower body. The mechanism includes a fixed element, a slide element, and two plates. The fixed element is fastened on the lower cover. The slide element may slide relative to the fixed element. The plates are fastened on two opposite sides of the slide element and the upper body.

18 Claims, 8 Drawing Sheets

SLIDE MECHANISM AND ELECTRONIC DEVICE USING THE SAME

BACKGROUND

1. Technical Field

The present disclosure relates to a slide mechanism and an electronic device using the same.

2. Description of Related Art

A slider electronic device ordinarily includes an upper body, an upper cover, a slide mechanism, a lower cover, and a lower body. The upper body is fastened on the upper cover. The lower cover is fastened on the lower body. The slide mechanism includes a fixed element and a slide element. The fixed element is fastened on the lower cover. The slide element is fastened together with the upper cover, such that the upper cover may slide relative to the lower cover. However, overall thickness of the slider electronic device is difficult to minimize due to the large number of components required.

Therefore, there is room for improvement within the art.

BRIEF DESCRIPTION OF THE DRAWINGS

Many aspects of the present disclosure can be better understood with reference to the following drawings. The components in the various drawings are not necessarily drawn to scale, the emphasis instead being placed upon clearly illustrating the principles of the present disclosure. Moreover, in the drawings, like reference numerals designate corresponding parts throughout the figures.

DETAILED DESCRIPTION

Figure 1:
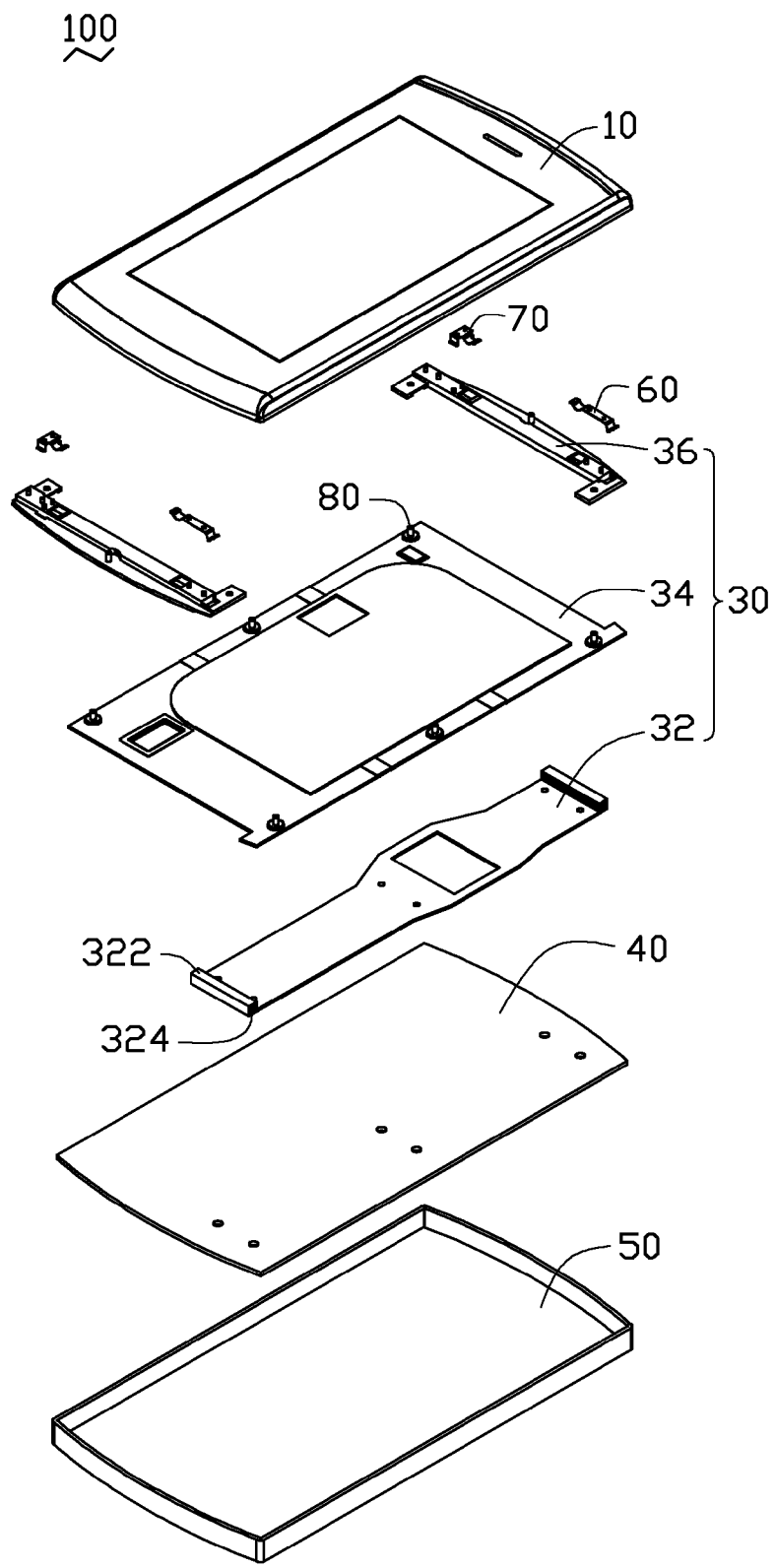
FIG. 1 is an exploded perspective view of one embodiment of an electronic device.

FIG. 1 is an exploded view of one embodiment of an electronic device 100. The electronic device 100 includes an upper body 10, a slide mechanism 30, a lower cover 40, and a lower body 50. The slide mechanism 30 includes a fixed element 32, a slide element 34 capable of sliding relative to the fixed element 32, and two plates 36 fastened on two opposite sides of the slide element 34. The plates 36 may be decorative. The upper body 10 is fastened on the plates 36. A first electric connecting element 60 and a second electric connecting element 70 are installed on each of the plates 36. The first electric connecting element 60 and the second electric connecting element 70 both electronically connect with the fixed element 32 and the slide element 34. The fixed element 32 is fastened on the lower cover 40. The lower cover 40 is fastened on the lower body 50.

A bent portion 322 is defined on each end of the fixed element 32. A guide groove 324 is defined on each bent portion 322. The slide element 34 is slidably received in the guide groove 324, such that the slide element 34 may slide relative to the fixed element 32. The slide element 34 is fastened together with the upper body 10 and the plates 36 through a plurality of fasteners 80. In the exemplary embodiment, the fastener 80 is a screw.

Figure 2:
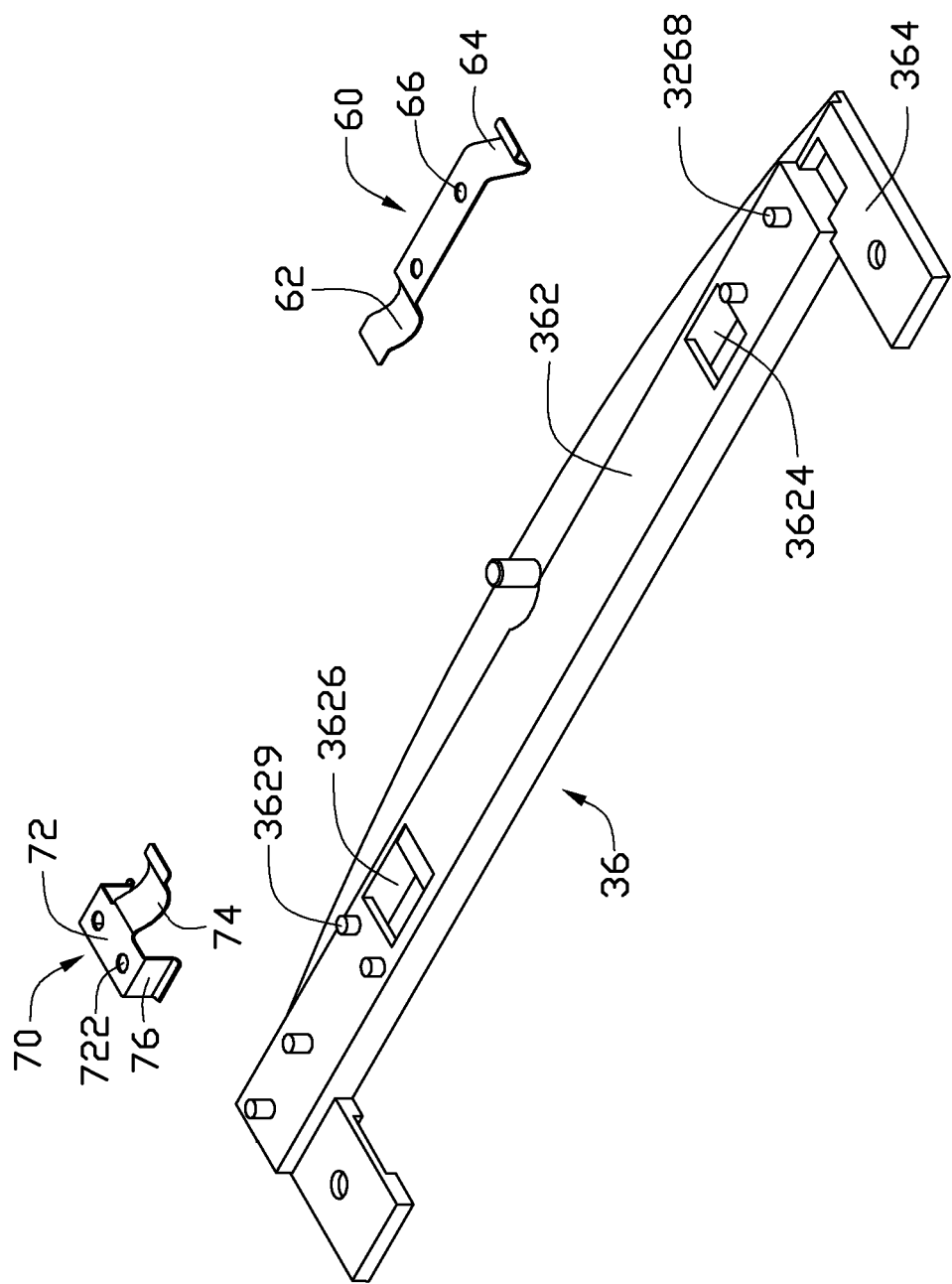
FIG. 2 is an enlarged view of a plate of FIG. 1.

FIG. 2 is an enlarged view of the plate 36 of FIG. 1. The plate 36 includes a main plate 362 and a fastening arm 364 extending from each end of the main plate 362. The plate 36 is fastened on the slide element 34 through the fastening arm 364.

The first electric connecting element 60 includes a first bent part 62 and a second bent part 64. The first bent part 62 is configured to elastically abut the fixed element 32. The second bent part 64 is configured to elastically abut the slide element 34. Two first fastening holes 66 are further defined on the first electric connecting element 60.

The second electric connecting element 70 includes a fastening plate 72, a first abutting arm 74, and two second abutting arms 76. The first abutting arm 74 extends from one side of the fastening plate 72. The two second abutting arms 76 extend from two opposite ends of the fastening plate 72. The first abutting arm 74 is configured to elastically abut the fixed element 32. The second abutting arm 76 is configured to elastically abut the slide element 34. Two second fastening holes 722 are further defined on the fastening plate 72.

Figure 3:
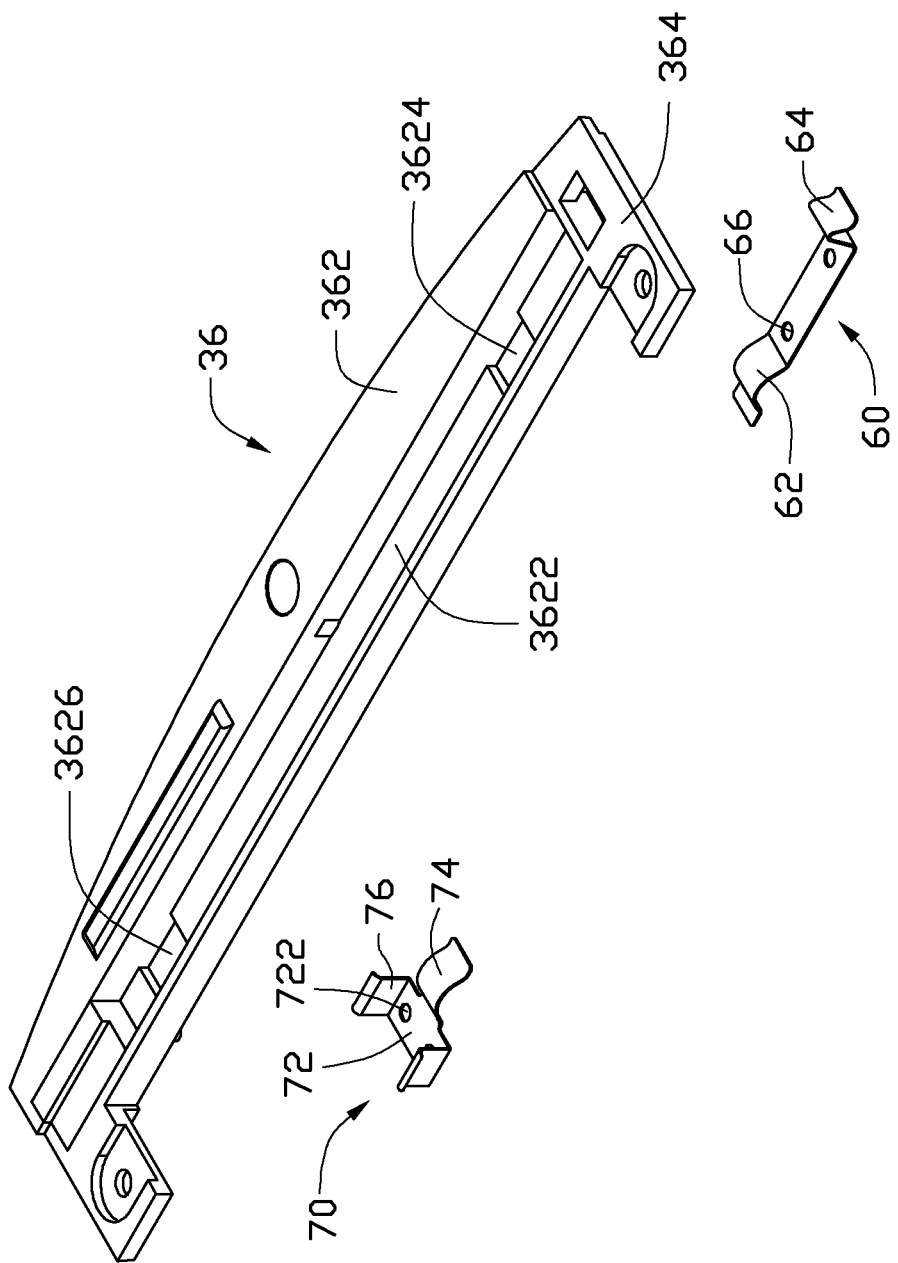
FIG. 3 is an inverted view of FIG. 2.

FIG. 3 is an inverted view of FIG. 2. A slide groove 3622 is longitudinally defined on the main plate 362. The slide element 34 may slide relative to the fixed element 32 through the slide groove 3622. A first through hole 3624 and a second through hole 3626 are defined on the slide groove 3622. The first through hole 3624 and the second through hole 3626 are individually near two ends of the slide groove 3622.

Referring to FIG. 2, two first fastening posts 3628 and two second fastening posts 3629 are defined on one surface of the main plate 362 reverse to the slide groove 3622. The two first fastening posts 3628 are near the first through hole 3624. The first two fastening posts 3628 can pass through the two first fastening holes 66 to fasten the first electric connecting element 60 together with the plate 36. The two second fastening posts 3629 are near the second through hole 3626. The two second fastening posts 3629 can pass through the two second fastening holes 722 to fasten the second electric connecting element 70 together with the plate 36.

Figure 4:
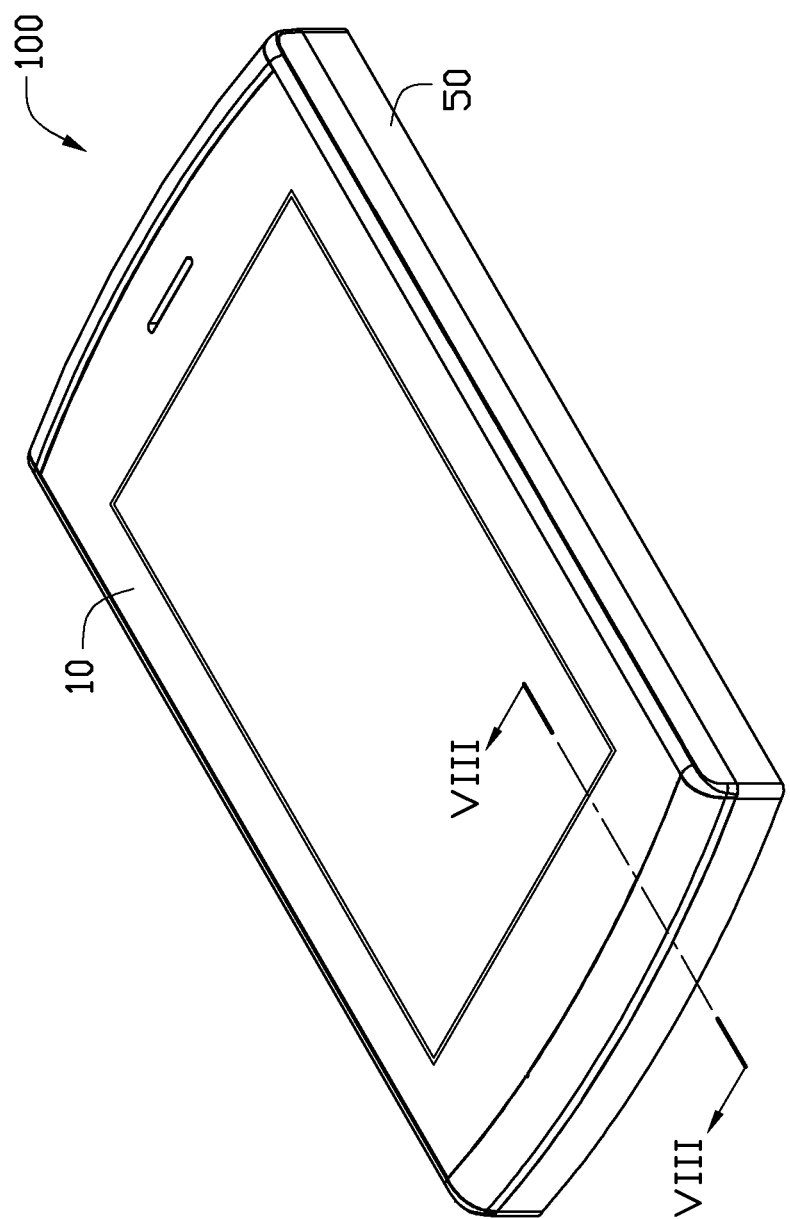
FIG. 4 is an assembly view of the electronic device of FIG. 1.
Figure 5:
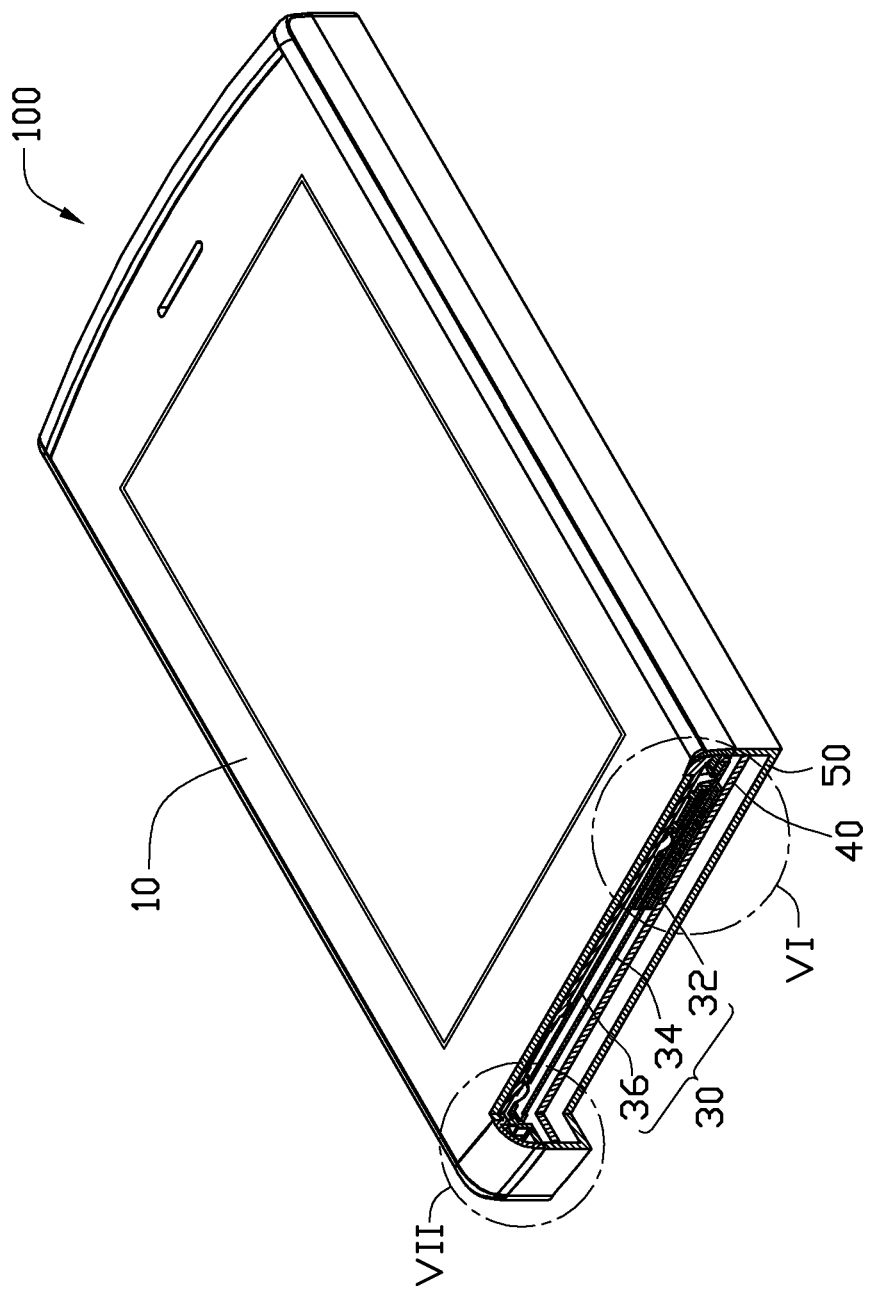
FIG. 5 is a partial cross-section of the electronic device of FIG. 4.
Figure 6:
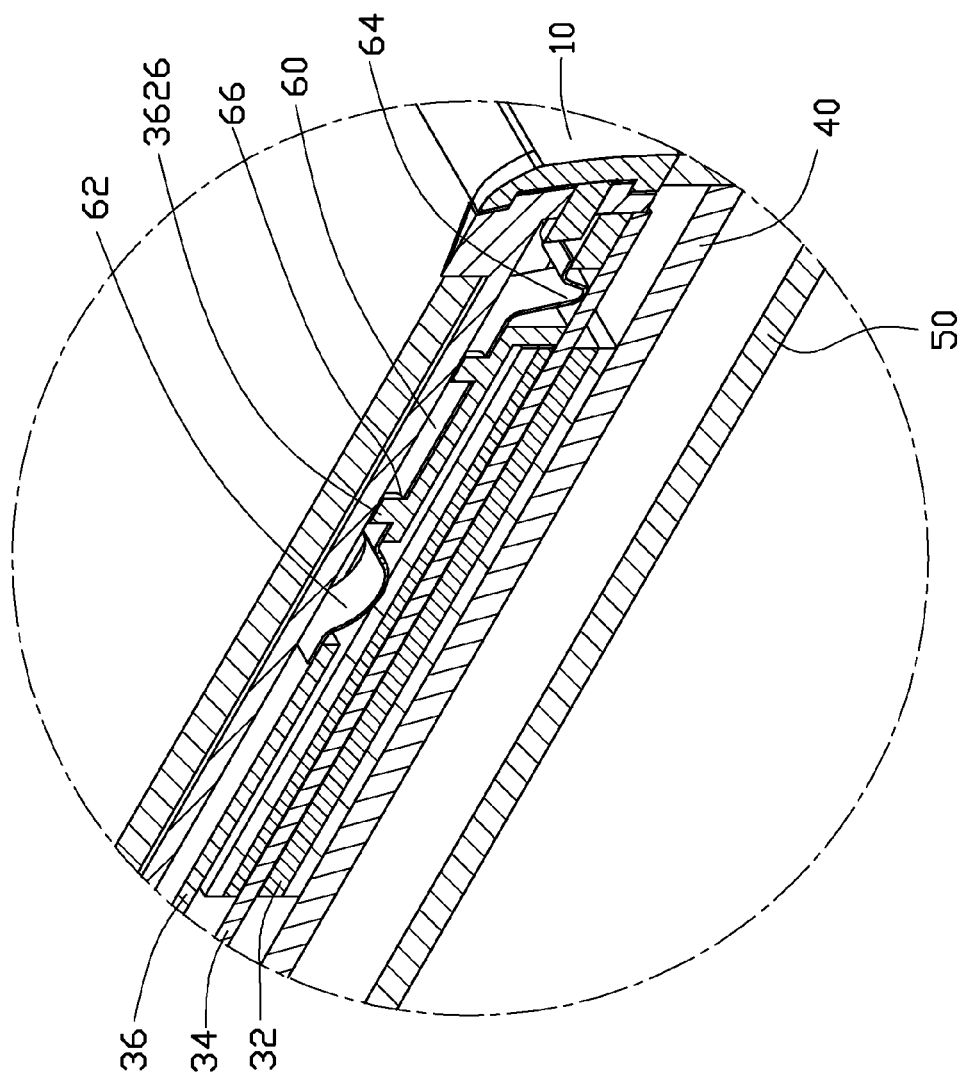
FIG. 6 is an enlarged partial view of a portion VI of FIG. 5.
Figure 7:
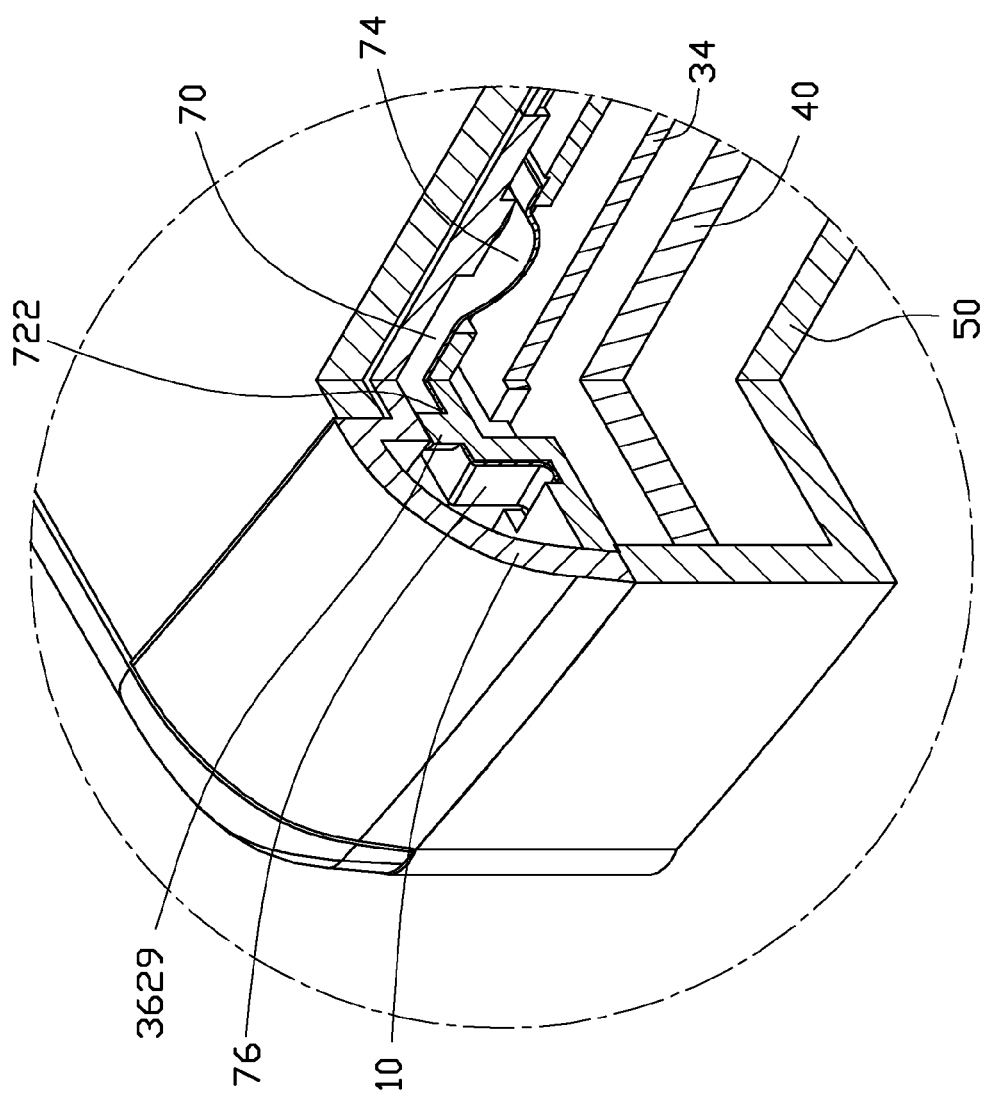
FIG. 7 is an enlarged partial view of a portion VII of FIG. 5.
Figure 8:
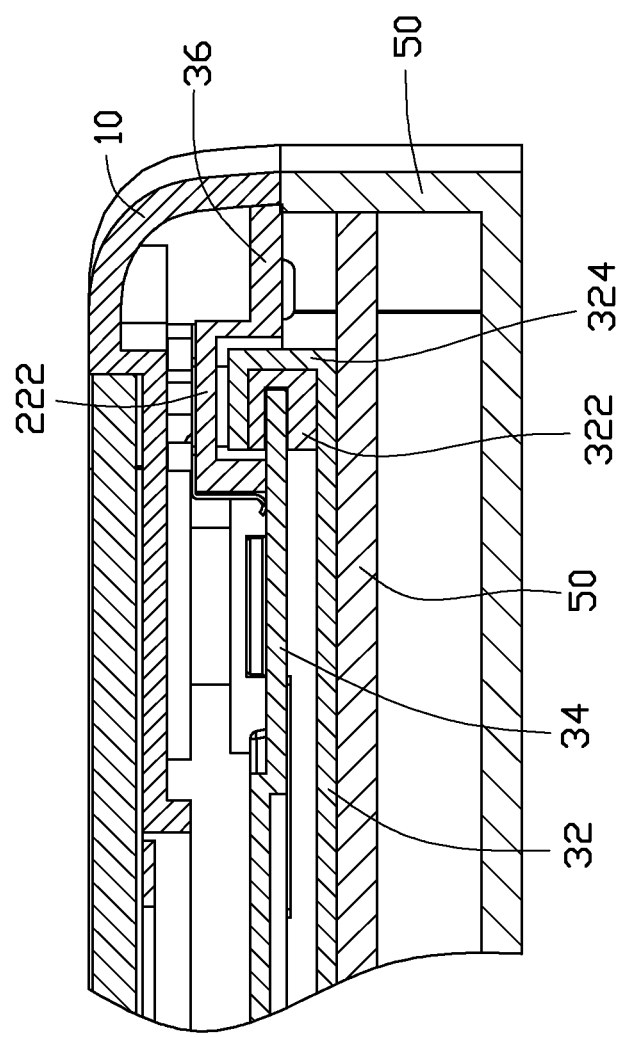
FIG. 8 is a cross-section along line VIII-VIII of the electronic device of FIG. 5.

FIG. 4 is an assembly view of the electronic device 100 of FIG. 1. Referring to FIGS. 5-8, the bent portion 322 is placed around the slide element 34, which may slide in the guide groove 324 of the bent portion 322 accordingly. The first electric connecting element 60 is placed around the first fastening posts 3628 through the first fastening holes 66. The first fastening posts 3628 may be hot melted to fasten the first electric connecting element 60 together with the plate 36. The second electric connecting element 70 is placed around the second fastening posts 3629 through the second fastening holes 722. The second fastening posts 3629 may be melted to fasten the second electric connecting element 70 together with the plate 36.

Each bent portion 322 of the fixed element 32 is placed in the slide groove 3622 of each plate 36. Each fastening arm 364 of the plate 36 is fastened together with the slide element 34 through the fasteners 80. The second bent part 64 of the first electric connecting element 60 and the second abutting arms 76 of the second electric connecting element 70 abut the slide element 34. The first bent part 62 of the first electric connecting element 60 and the first abutting arm 74 of the second electric connecting element 70 abut the bent portion 322 of the fixed element 32. The upper body 10 is fastened together with the two plates 36 through the fasteners 80.

The present disclosure provides a slider electronic device requiring no upper cover. As a result, the thickness of the slide-type of electronic device may be reduced.

It is to be further understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the present invention to the full extent indicated by the broad general meaning of the terms in which the appended claims are expressed.

What is claimed is:

1. A slide mechanism, comprising:
a fixed element;
a slide element capable of sliding relative to the fixed element; and
two plates fastened on two opposite sides of the slide element;
wherein a first electric connecting element and a second electric connecting element are installed on each of the plates, the first electric connecting element and the second electric connecting element both electrically connect with the fixed element and the slide element.

2. The slide mechanism of claim 1, wherein each of the two plates comprises:
a main plate;
a slide groove defined on the main plate; and
a fastening arm extending from each end of the main plate;
wherein each plate is fastened on the slide element on one of the fastening arms.

3. The slide mechanism of claim 2, wherein a bent portion is defined in each end of the fixed element, and slidably received in the slide grooves.

4. The slide mechanism of claim 3, wherein a guide groove is defined on each of the bent portions, and the slide element is slidably received in the guide groove.

5. The slide mechanism of claim 2, wherein the first electric connecting element comprises:
a first bent part configured to abut the fixed element; and
a second bent part configured to abut the slide element.

6. The slide mechanism of claim 5, wherein the plate further comprises a first hole defined on the slide groove, and the first bent part passes through the first through hole to abut the fixed element.

7. The slide mechanism of claim 6, wherein the second bent part passes through the fastening arm near the first pass hole to abut the slide element.

8. The slide mechanism of claim 7, wherein two first fastening holes are defined on the first electric connecting element.

9. The slide mechanism of claim 8, wherein two first fastening posts are defined on one surface of the plate reverse to the slide groove, and the first fastening post passes through the first fastening hole.

10. The slide mechanism of claim 1, wherein the second electric connecting element includes a fastening plate, a first abutting arm, and two second abutting arms, the first abutting arm extends from one side of the fastening plate, the two second abutting arms extend from two opposite ends of the fastening plate, the first abutting arm is configured to elastically abut the fixed element, the second abutting arm is configured to elastically abut the slide element.

11. An electronic device, comprising an upper body, a lower cover, a lower body, and a slide mechanism installed between the upper body and the lower cover, wherein the slide mechanism comprising:
a fixed element;
a slide element capable of sliding relative to the fixed element; and
two plates fastened on two opposite sides of the slide element;
wherein a first electric connecting element is installed on each of the plates, the first electric connecting element comprises a fist bent part configured to abut the fixed element, and a second bent part configured to abut the slide element.

12. The electronic device of claim 11, wherein each of the plates comprises:
a main plate;
a slide groove defined on the main plate; and
a fastening arm extending from each end of the main plate;
wherein each plate is fastened on the slide element on one of the fastening arms.

13. The electronic device of claim 12, wherein a bent portion is defined in each end of the fixed element, and slidably received in the slide grooves.

14. The electronic device of claim 13, wherein a guide groove is defined on each of the bent portions, and the slide element is slidably received in the guide groove.

15. The electronic device of claim 12, wherein the plate further comprises a first through hole defined on the slide groove, and the first bent part passes through the first through hole to abut the fixed element.

16. The electronic device of claim 15, wherein the second bent part passes through the fastening arm near the first pass hole to abut the slide element.

17. The electronic device of claim 16, wherein two first fastening holes are defined on the first electric connecting element.

18. The electronic device of claim 17, wherein two first fastening posts are defined on one surface of the plate reverse to the slide groove, and the first fastening post passes through the first fastening hole.

* * * * *